3,386,947
VULCANIZATION OF POLY(VINYL ALKYL ETHERS) BY A SULFUR BEARING CURING AGENT AND AN ORGANIC PEROXIDE
Joginder Lal and Kenneth W. Scott, Cuyahoga Falls, Ohio, assignors to The Goodyear Tire & Rubber Company, Akron, Ohio, a corporation of Ohio
No Drawing. Filed Apr. 5, 1960, Ser. No. 20,028
1 Claim. (Cl. 260—41)

This invention relates to a process for modifying high molecular weight polymeric vinyl alkyl ethers. More particularly, this invention relates to a process for vulcanizing polymeric vinyl alkyl ethers compounded with reinforcing agents such as carbon black, silica, etc.

Polymeric vinyl alkyl ethers and their copolymers have good low temperature properties and would be desirable for use in certain rubber applications provided they could be satisfactorily compounded and vulcanized. Several patents, for example Schildknecht's U.S. 2,429,587 and 2,483,374 describe methods of treating polyvinyl alkyl ether polymers with dibenzoyl peroxide, acetylbenzoyl peroxide and dilauroyl peroxide to effect the solubility of the polymeric vinyl alkyl ethers in certain common organic solvents. However, when we compounded vinyl alkyl ether polymers with reinforcing carbon blacks, these organic peroxides were not able to appreciably reduce the solubility of the vinyl alkyl ethers in the common organic solvents. Even though the prior art has taught these organic peroxides to be able to reduce the solubility of the polymeric vinyl alkyl ethers in the common organic solvents, it does not teach how the poly(vinyl alkyl ethers) may be compounded with a reinforcing carbon black to obtain good vulcanizates. Also U.S. Patent 2,483,374 teaches that the previously enumerated organic peroxides have a degrading effect upon the heat treated polymeric vinyl alkyl ethers. It has not been possible prior to our discovery to vulcanize the polymeric vinyl alkyl ethers to obtain products having useful rubbery properties since the tensile strengths of the vulcanizates were around 100 and at their best no more than about 400 pounds per square inch.

Consequently, a principal object of this invention is to provide a method for curing or vulcanizing polymeric vinyl alkyl ethers to yield a cured product having a high degree of cross linking as measured by the swell volume and solubility in the common organic solvents.

A further object of this invention is to provide a compounding recipe for vulcanizing polymeric vinyl alkyl ethers in the presence of reinforcing fillers or agents, such as carbon black, silica, etc. to yield vulcanizates having tensile strengths of at least about 1000, and preferably about 1500 to 2500 pounds per square inch, or higher.

Another object of this invention is to provide a curing system for poly(vinyl alkyl ethers) which allows addenda such as the carboxylic acids and metal oxides to be used to vary the physical properties of the cured elastomer.

Still further objects of this invention will be apparent in the following discussions and claims.

We have discovered that poly(vinyl alkyl ethers) can be vulcanized to yield rubbery polymeric vinyl alkyl ether compositions having good tensile strength—even in excess of 1000 pounds per square inch. These vulcanizates are obtained by incorporating from about 0.1 to 6% and higher of a ditertiary aryl peroxide having the formula shown hereinafter, and then heat treating this composition, preferably under pressure, at a temperature from about 250 to 350° F. for a sufficient time to develop the desired physical properties.

We have discovered also that poly(vinyl alkyl ethers) can be cured with organic peroxides of this type even when the curing recipe contains an appreciable quantity of a reinforcing filler, such as carbon black, inorganic fillers such as silica, and other curing aids.

We have discovered, in addition to the above, that the use of sulfur bearing curing agents (as defined hereinafter) in conjunction with these organic peroxides increase the tensile strength of the cured product significantly, usually several hundred pounds per square inch.

The class of organic peroxides useful in this invention are the hexa-substituted dimethyl peroxides with each carbon atom connected to the oxygen of said peroxide having one of the valence bonds satisfied by a radical selected from the class of aryl and haloaryl and having the other two valences of each of said carbon atoms satisfied by bonding with an alkyl radical having less than about 10 carbon atoms. The peroxides of this class may be represented by the following formula:

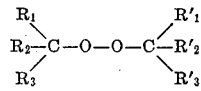

where $R_1$, $R'_1$, $R_2$ and $R'_2$ are alkyl groups having less than about ten carbon atoms, preferably less than about seven carbon atoms, and $R_3$ and $R'_3$ are aryl or haloaryl groups such as phenyl, tolyl, chlorophenyl and naphthyl. Representative examples of such peroxides are di(alpha, alpha-dioctyl benzyl) peroxide; di(alpha,alpha-diethyl benzyl) peroxide; di(alpha,alpha-dimethyl benzyl) peroxide (also known as dicumyl peroxide); di(alpha,alpha-dimethyl-p-chlorobenzyl) peroxide; di(alpha,alpha-dimethyl-2,4-dichlorobenzyl) peroxide; di(alpha,alpha-dihexylbenzyl) peroxide and di(alpha,alpha-dimethylnaphthyl methyl) peroxide. Each R group may be the same as the respective prime group or it may be different.

When $R_3$ and $R'_3$ in the above formula are methyl groups, for example, as in the case of ditertiary butyl peroxide, these peroxides are inoperative in this invention as the cured product has a tensile strength normally of about 400 pounds per square inch. Thus it is necessary that at least one of the hydrocarbon groups attached to the methyl carbon adjacent to the peroxy group must be an aryl group to obtain a cured elastomer having superior tensile properties. Dicumyl peroxide affords excellent confirmation of this. For instance, when dicumyl peroxide is compounded with a poly(vinyl alkyl ether) and this composition is vulcanized by suitable heat treatment, the resulting vulcanizate has a swell volume less than about ten at 30° C. and a solubility in the common organic solvents, e.g., benzene, substantially less than about 15% by weight at 30° C. On the other hand, when an organic peroxide is used which does not contain an aryl group attached to the tertiary carbon adjacent to the peroxy group, the resulting vulcanizate has relatively high swell volumes considerably greater than about 20 with the solubility in the common organic solvents, such as benzene, chloroform, etc., being in excess of about 50%.

Any of the polymeric vinyl alkyl ethers may be vulcanized with the organic peroxides of this invention. Representative examples of these vinyl alkyl ethers are vinyl methyl ether, vinyl ethyl ether, vinyl isopropyl ether, vinyl n-butyl ether, vinyl isobutyl ether, vinyl n- hexyl ether, vinyl 2-ethylhexyl ether, vinyl n-octyl ether, vinyl octadecyl ether, etc. Accordingly, the term "vinyl alkyl ether polymer" as used in the claims is intended to embrace the homopolymer, mixtures thereof, and copolymers thereof as defined and illustrated above with the alkyl chain being normally less than 20 carbon atoms and preferably les than about 10. In this specification and claims the inherent viscosity of the poly(vinyl alkyl ethers) are determined at 30° C. on a 0.1 percent by weight solution of said poly(vinyl alkyl ether) in benzene. Normally, the poly(vinyl alkyl ethers) have an inherent viscosity of 0.2 to in excess of 10, with the preferred range being from about 2 to 6 deciliters per gram.

Normally the amount of organic peroxide added to the poly(vinyl alkyl ether) will vary with the particular polymer being treated as well as with the temperature of the heat treatment. Consequently, longer curing times will be required where low temperatures are employed than where high temperatures are employed. In general, the addition of about 0.1 to about 15 percent by weight of the peroxide of this invention will be sufficient to give a cure with the poly(vinyl alkyl ether) but the preferred range is from about 0.5 to 10 percent. However, with dicumyl peroxide, the range normally is 0.5 to 6%. Larger amounts of peroxide may be added if it is not used efficiently as a result of a short cure time or use of low temperature during the curing cycle.

The best tensile strengths for the cured poly(vinyl alkyl ethers) are obtained when a reinforcing filler is used in the curing recipe. Normally, about 10 to 80 parts of filler per 100 parts of poly(vinyl alkyl ether) can be used with the preferred range being about 20 to 55 parts per hundred. Representative reinforcing fillers are the finely divided silica fillers such as Cab-o-Sil available commercially, and the carbon blacks such as those known as HAF (high abrasion furnace black), ISAF (intermediate superior abrasion black), medium process channel black (MPC), and easy process channel black (EPC). Super abrasion furnace carbon black is preferred with sulfur free curing recipes.

Where a sulfur bearing curing agent, or as sometimes referred to herein, a sulfur producing curing agent is used to aid in curing the poly(vinyl alkyl ethers), normally about 0.25 to 3 parts of said sulfur bearing curing agent per 100 parts of poly(vinyl alkyl ether) may be used, although in some cases, 30 or more parts of sulfur bearing curing agent may be used. However, the amount of sulfur used usually will vary from about 0.05 to 15 percent by weight with the preferred range being from 0.1 to 5 percent. The term "sulfur bearing curing agent" is intended to include free sulfur and the sulfur-containing or releasing curing agents such as those listed hereinafter. The amount of organic peroxide and sulfur used in the curing recipe may be varied to develop certain desired physical properties as well as to vary the length of the curing cycle.

Representative examples of the sulfur-containing or sulfur producing curing agents are the low molecular weight hydrocarbon polymeric sulfur compounds such as those prepared, for example, by reacting an alkylene dichloride or bis(chloroalkyl ether) with an alkali polysulfide; the thiuramdisulfides such as tetramethylthiuramdissulfide, tetraethylthiuramdisulfide, tetraphenylthiuramdisulfide, tetracyclohexylthiuramdisulfide, dipentamethylenethiuramdisulfide, and including higher thiuramsulfides such as dipentamethylenethiuramtetrasulfide; the dixanthates such as isopropylxanthogendisulfide, the dithiodiaroyldisulfides such as dithiobenzoyldisulfide; the aminepolysulfides such as dithio-bis-diethylamine, dithio-bis-dipropylamine, dithio-bis-dibutylamine, dithio-bis-dicyclohexylamine and dithio-bis-morpholine; the alkyl thiocarbamyl polysulfides such as tertiary butyl dimethyl thiocarbamyl disulfide and tertiary butyl dimethylthiocarbamyltrisulfide; and the N-substituted dithiothiazoles such as the amino dithio thiazoles, 2-(dimethylamino dithio)-benzothiazole, 2-(diethylamino dithio)-benzothiazole, 2-dicyclohexyl amino dithio)-benzothiazole and 2-(4-morpholinyl dithio)-benzothiazole. In general, any of those curing agents which give up sulfur to the rubber during vulcanization can be used in the proceses of this invention either alone or in combination with sulfur.

The amount of sulfur releasing curing agent required for the process of this invention will depend somewhat on the particular material employed and may be varied over wide ranges. While smaller or larger amounts can be used, the amount will usually be within the range from 0.5 to 10.0 parts, with the preferred range usually being from 1.0 to 3.0 parts per 100 parts by weight of the natural rubber. The customary compounding practices used with a particular curing agent are followed. Thus, where it is customary to use zinc oxide or stearic acid or some other material with a particular curing agent that practice is followed here.

Although it is preferred to use only the specific organic peroxides of this invention either alone or in conjunction with sulfur bearing curing agents to cure the poly(vinyl alkyl ethers), additional chemicals may be added to accelerate the curing, etc. For example, any one of a number of functional carboxylic acids may be used.

Representative functional acids are maleic acid or anhydride, fumaric, acrylic, methacrylic, ethacrylic, vinylacrylic, itaconic, methylitaconic, aconitic, methylaconitic, crotonic, alpha-methylcrotonic, cinnamic and 2,4-dihydroxy-cinnamic acids, citraconic anhydride, sorbic acid, etc. When the functional acids are used, compounds capable of forming crosslinks between the various polymer chains in conjunction with the functional acid groups, i.e., reticulators, should be used also in the compounding recipe. Reticulators having this property are the metal oxides and hydroxides, glycols, diamines, etc. Examples of particularly suitable metal oxides are the oxides and hydroxides of zinc, calcium, cadmium, magnesium, titanium, lead and iron. Various results using these curing aids are illustrated in the examples given below. Normally from 1 to 10 parts of functional acid may be used together with at least an equivalent amount of reticulator.

Also, it is a preferred practice to use a stabilizing agent or antioxidant material in the curing recipe for the poly(vinyl alkyl ether). For example, about 0.1 to 5 percent of a stabilization agent such as parahydroxyphenyl morpholine may be used to stabilize the vulcanizate against depolymerization at high temperatures. Normally the heat treatment and curing of the polymer with organic peroxide alone or in combination with sulfur may be performed in any suitable manner such as a heated pressurized mold. Usually the heat treatment may vary from a relatively short period of time, such as ten minutes to a long time, such as about 90 minutes, or more, with the temperature of heat treatment being from about 250 to 350° F. It should be appreciated that the length of heat treatment and temperature of treatment may be varied to obtain optimum cure.

In this specification and claims the various ingredients in the compounding recipes are expressed as parts per 100 part (phr.) of the poly(vinyl alkyl ether). The tensile strength measurements on the vulcanizates were made at 25° C. with an Instron tester operating at a cross-head speed of 2 inches per minute and the samples used were of the standard dumbbell type about $\frac{1}{10}''$ x $\frac{1}{16}''$ in cross-section. Similarly the term "swell volume" as used herein is reported as the ratio of the volume of the swollen rubber after 70 hours contact at 25° C. with benzene containing 0.1 percent of the antioxidant, phenyl betanaphthylamine, to the volume of the dried rubber. The swell volume is reported after correcting for the volume of filler present in the rubber i.e. on a filler-free basis. The solubility values are expressed as percent by weight solubility of the vulcanizate corrected for filler after standing in benzene at 25° C. for 70 hours.

The following examples illustrate various advantages and ways of obtaining the benefit of this invention.

Example 1

Fifteen parts of poly(vinyl n-butyl ether) having at 30° C. an inherent viscosity of 4.0 deciliters per gram in a 0.1 percent by weight solution in benzene, were compounded with 0.90 part of dicumyl peroxide (95% peroxide) on a mill. The mixture was vulcanized by heating at 300° F. under pressure in a mold cavity. The curing time was 2 hours. The vulcanized material had a swell volume of 12.0 and a solubility of 10.2 percent.

Example 2

Poly(vinyl ethyl ether), 100 parts, was mixed with 50 parts of carbon black (high abrasion furnace type, HAF) in a Banbury at 300° F. for about 10 minutes. One hundred parts of the black stock were milled with 10 parts of Di-Cup 40C (40 percent dicumyl peroxide with the balance being calcium carbonate) and varying amounts of sulfur as shown in Table I. Vulcanizations were carried out at 310° F. for 30 minutes under pressure. The vulcanizate properties are shown in Table I.

TABLE I

| Physical Property | Sulfur, parts per hundred of polymer | | | | |
| --- | --- | --- | --- | --- | --- |
|  | 0 | 0.25 | 0.50 | 0.75 | 1.0 |
| Tensile Strength, p.s.i. | 1,660 | 1,890 | 1,925 | 1,900 | 1,962 |
| Elongation at break, percent | 600 | 390 | 540 | 600 | 600 |
| 300% modulus, p.s.i. | 540 | 1,367 | 820 | 685 | 752 |
| 100% modulus, p.s.i. | 96 | 177 | 112 | 109 | 129 |
| Shore Hardness A | 54 | 59 | 54 | 56 | 54 |
| Solubility | 9.4 | 6.85 | 9.0 | 9.05 | 9.55 |
| Swell Volume | 7.64 | 5.63 | 6.43 | 6.57 | 6.67 |

Example 3

The experiment of Example 2 was repeated using 40 parts of carbon black (intermediate superior abrasion furnace type, ISAF), 10 parts Di-Cup 40C and 0.37 part part sulfur. Vulcanizates obtained by curing at 325° F. for 30 minutes had the following properties:

Tensile strength, p.s.i. _____ 2400
Elongation at break, percent _____ 440
300% modulus, p.s.i. _____ 1050
Shore hardness A _____ 50
Solubility _____ 4.2
Swell volume _____ 6.2

Example 4

Poly(vinyl n-butyl ether) 100 parts, having an inherent viscosity of 4.2 deciliters per gram of 30° C. in a 0.1 percent by weight benzene solution was mixed with 50 parts of carbon black (HAF) in a Banbury at 300° F. for 10 minutes. The black stock was milled to incorporate 10 parts of Di-Cup 40C and 0.34 part of sulfur for each 150 parts of black stock and then vulcanized at 310° F. for 45 minutes to give a cured stock having the following properties:

Tensile strength, p.s.i. _____ 1,670
Elongation at break, percent _____ 500
300% modulus, p.s.i. _____ 790
Shore hardness A _____ 48
Swell volume _____ 6.0
Solubility _____ 6.5

Example 5

Poly(vinyl isobutyl ether) 100 parts, having an inherent viscosity of 3.5 deciliters per gram at 30° C. in a 0.1 percent by weight benzene solution was mixed with 50 parts of carbon black (HAF), 10 parts of Di-Cup 40C and 0.25 part sulfur and cured at 310° F. for 60 minutes in the manner described in Example 2.

The following properties were obtained for the vulcanizate:

Tensile strength, p.s.i. _____ 2,050
Elongation at break, percent _____ 400
300% modulus, p.s.i. _____ 1,510
Shore hardness A _____ 62
Solubility _____ 1.4
Swell volume _____ 5.5

Example 6

Poly(vinyl ethyl ether) 100 parts was milled with 50 parts of finely divided silica filler (Cab-o-Sil) and 10 parts Di-Cup 40C and then it was vulcanized at 310° F. for 30 minutes to give an elastomeric material having the following properties:

Tensile strength, p.s.i. _____ 1,165
Elongation at break, percent _____ 790
300% modulus, p.s.i. _____ 235
Solubility _____ 7.8
Swell volume _____ 10.9

Example 7

The experiment using poly(vinyl ethyl ether) was repeated as in Example 2 with the following recipe:

Rubber _____ 100
Carbon black (HAF) _____ 30
Di-Cup 40C _____ 10
Sulfur _____ 1
Stearic acid _____ 0.5

Vulcanizate obtained by curing at 310° F. for 30 minutes had the following properties:

Tensile strength, p.s.i. _____ 1,770
Elongation at break, percent _____ 645
300% modulus, p.s.i. _____ 385
Solubility _____ 7.1
Swell volume _____ 7.5

Example 8

The poly(vinyl ethyl ether) of Example 2 was compounded and cured with the following recipe:

Rubber _____ 100
Carbon Black (HAF) _____ 50
Di-Cup 40C _____ 10
Sulfur _____ 0.5
Antioxidant* _____ 1.0

*A mixed aryl para phenylene diamine.

Vulcanization was carried out by heating the material at 310° F. for 60 minutes. The cured rubber had the following properties:

Tensile strength, p.s.i. _____ 1,915
Elongation at break, percent _____ 790
300% modulus, p.s.i. _____ 640
Swell volume _____ 7.2
Solubility _____ 3.9

Example 9

Poly(vinyl n-octyl ether) 100 parts was mixed with 2 parts of Di-Cup and 0.4 part sulfur. The mixture was vulcanized at 275° F. for 30 minutes to give a product substantially insoluble in benzene.

Example 10

Poly(vinyl n-butyl ether) 100 parts was mixed with 50 parts carbon black (HAF) in a Banbury at 300° F. for 10 minutes and then this black stock was used in a series of experiments employing various peroxides. The amounts of the various peroxides used were equivalent to 10 parts of Di-Cup 40C. In those recipes where sulfur was used, it was compounded at the rate of 0.25 part per hundred of polymer. Curing was done at 310° F. for the length of time indicated. The physical properties of these vulcanizates are shown in Table II.

TABLE II

| Sample No. | I | II | III | IV | V | VI |
|---|---|---|---|---|---|---|
| Curative, phr.: | | | | | | |
| Di-Cup 40C | 10 | | | | | |
| Dilauroyl peroxide | | 5.9 | | | | |
| Dibenzoyl peroxide | | | 3.6 | 3.6 | | |
| Ditertiary butyl peroxide [2] | | | | | 16.6 | 16.6 |
| Sulfur | 0.25 | 0.25 | | 0.25 | 0.25 | |
| 15 Minute Cure: | | | | | | |
| Tensile Strength, p.s.i. | 1,560 | 118 | 72 | 200 | 400 | 420 |
| Percent Elongation | 470 | 370 | 160 | 500 | 920 | 980 |
| 300% modulus | 900 | 93 | | 150 | 180 | 170 |
| Solubility | 6.8 | [1] 99 | [1] 93 | [1] 85 | [1] 96 | [1] 70 |
| Swell Volume | 5.55 | | [1] 23 | [1] 28 | [1] 32 | [1] 29 |
| 30 Minute Cure: | | | | | | |
| Tensile Strength, p.s.i. | 1,580 | 240 | 100 | 300 | 445 | 450 |
| Elongation, percent | 320 | 745 | 150 | 860 | 1,040 | 1,045 |
| 300% modulus | 1,450 | 100 | | 145 | 180 | 170 |

[1] Approximate values.
[2] This ditertiary butyl peroxide was added as a molecular sieve composition consisting of 13 percent of said peroxide absorbed on a molecular sieve type synthetic zeolite.

The data in Table II indicate clearly that the heat treated samples II, III, and IV obtained from dilauroyl and dibenzoyl peroxides, which belong to the class of diacyl and diaroyl peroxides, respectively, have very poor tensile strength and are predominantly soluble in benzene. The ditertiary butyl peroxide cured samples V and VI also are highly soluble in benzene and have inadequate tensile strength. The high degree of crosslinking of sample I, as evidenced by its low swell volume, high tensile strength and modulus values, and low percent solubility, demonstrates conclusively the significantly superior properties of the Di-Cup vulcanized sample over those of samples V and VI. From this data it should be obvious that in the cited formula:

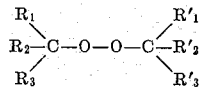

the $R_3$ and $R'_3$ groups must be aryl, for example, phenyl or chlorophenyl, in order to produce satisfactory vulcanizates. Also, it was observed that when sample I was cured for longer than 30 minutes, for instance 2 hours, there was no loss in tensile strength.

Example 11

A black stock was obtained by mixing poly(vinyl ethyl ether) 100 parts, with 50 parts of carbon black (HAF) in a Banbury as in Example 2. This stock (100 parts) was compounded on a mill with 10 parts of Di-Cup 40C, 2.5 parts of sulfur, 2.5 parts of p-quinone dioxime and 12.5 parts of red lead, and was vulcanized at 310° F. for 60 minutes. The cured elastomer had the following physical properties:

| | |
|---|---|
| Tensile strength, p.s.i. | 1,640 |
| 300% modulus, p.s.i. | 700 |
| Elongation at break, percent | 535 |
| Shore hardness A | 58 |

Example 12

Poly(vinyl n-butyl ether) 100 parts, having an inherent viscosity of 4.0 deciliters per gram at 30° C. in a 0.1 percent solution in benzene, was compounded on a mill with 50 parts of carbon black (HAF), 5 parts of Di-Cup 40C, 8 parts of maleic anhydride and 20 parts of zinc oxide. The compounded mass was vulcanized by heating for 30 minutes at 310° F. in a mold cavity. The vulcanizate had the following properties:

| | |
|---|---|
| Tensile strength, p.s.i. | 1,065 |
| 300% modulus, p.s.i. | 885 |
| Elongation at break, percent | 360 |
| Volume swelling | 6.17 |
| Solubility | 8.0 |
| Shore hardness A | 50 |

When the zinc oxide was replaced by other metal oxides, for example lead dioxide, and titanium dioxide, the physical properties were at least as good as those given in this recipe.

Example 13

The experiment in Example 12 was repeated except 5 parts of sulfur was used in the compounding recipe. The following properties were obtained on the vulcanizates.

| | |
|---|---|
| Tensile strength, p.s.i. | 1,190 |
| 300% modulus | 520 |
| Elongation, percent | 560 |
| Volume swelling | 7.1 |
| Solubility | 14 |

Example 14

The experiment in Example 12 was repeated except 15 parts of 1,4-butanediol was used in the compounding recipe. The following properties were obtained on the cured elastomer.

| | |
|---|---|
| Tensile strength, p.s.i. | 1,100 |
| 300% modulus | 840 |
| Elongation at break, percent | 410 |
| Swell volume | 6.70 |
| Solubility | 5.8 |
| Shore hardness A | 59 |

Example 15

The black stock used in Example 10, 150 parts, was milled with 20 parts of zinc oxide, 5 parts of Di-Cup 40C and 2 parts of sorbic acid. This elastomeric material when cured at 310° F. for 30 minutes had the following physical properties:

| | |
|---|---|
| Tensile strength, p.s.i. | 1,510 |
| 300% modulus | 1,480 |
| Elongation at break, percent | 305 |
| Swell volume | 5.8 |
| Solubility | 3.7 |
| Shore hardness A | 54 |

Example 16

The experiment in Example 12 was repeated using 9.5 parts of maleic acid instead of maleic anhydride. The vulcanizate cured at 310° F. for 30 minutes had the following properties:

| | |
|---|---|
| Tensile strength, p.s.i. | 1,040 |
| 300% modulus | 785 |
| Elongation at break, percent | 380 |
| Swell volume | 6.4 |
| Solubility | 8.5 |

Example 17

Two hundred parts of poly(vinyl ethyl ether) were milled with 16 parts of maleic anhydride and 2 parts of Di-Cup 40C. The mixture was heated at 290° F. for 60 minutes in an atmosphere of high purity nitrogen. It was then milled with 100 parts of carbon black (HAF), 2 parts of stearic acid and 20 parts of zinc oxide. On curing at 310° F. for 15 minutes an elastomeric material having a swell volume of 4.85, solubility of 7 percent, and a Shore hardness A of 58 was obtained. This compounding technique appears to utilize the peroxide more efficiently as evidenced by the lower swell volume and solubility data but it requires more time and labor.

Example 18

Poly(vinyl ethyl ether) 100 parts was mixed with 50 parts of carbon black (HAF) in a Banbury mixer at 300° F. for about 10 minutes. The black stock was then milled with 10 parts of Di-Cup 40C and 1 part of a Thiokol VA-7 polysulfide polymer. (VA-7 is reported to be a low molecular weight polysulfide polymer of the $R(S_nR)_x$ type in which $n$, the sulfur rank, averages 4.5, R is an alkyl ether radical resulting from the reaction of a dichloro alkyl ether with sodium polysulfide and $x$ is the number of polymer units needed to give a molecular weight of about 1000 to 4000.) The compounded material was vulcanized at 310° F. for 30 minutes. The vulcanizate had the following properties:

| | |
|---|---:|
| Tensile, p.s.i. | 1,730 |
| Elongation at break, percent | 435 |
| 300% modulus p.s.i. | 930 |
| 100% modulus p.s.i. | 136 |
| Shore hardness A | 57 |

Example 19

Poly(vinyl ethyl ether) 100 parts, which had been mixed with 50 parts of carbon black (HAF) in a Banbury at 300° F. were compounded on a mill with 10 parts of Di-Cup 40C and 1 part of dipentamethylene thiuram tetrasulfide (sold under the trade name "Sulfads" by the Vanderbilt Co.). The compounded material was vulcanized by heat treating at 310° F. for 30 minutes. The vulcanizate had the following physical properties:

| | |
|---|---:|
| Tensile, p.s.i. | 1,760 |
| Elongation at break, percent | 545 |
| 300% modulus p.s.i. | 635 |
| 100% modulus p.s.i. | 115 |
| Shore hardness A | 57 |

While certain representative embodiments and details have been shown for the purpose of illustrating the invention, it will be apparent to those skilled in this art that various changes and modifications may be made therein without departing from the spirit or scope of the invention.

What is claimed is:
1. A curable poly(vinyl alkyl ether) composition comprising 100 parts of poly(vinyl alkyl ether), a sulfur bearing curing agent, from 0.5 to 10 parts by weight of an organic peroxide of the following formula:

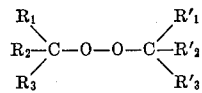

where $R_1$, $R'_1$, $R_2$ and $R'_2$ are alkyl groups having less than 10 carbon atoms, and $R_3$ and $R'_3$ are aryl groups selected from the class consisting of phenyl, chlorophenyl and naphthyl, at least one part of carboxylic acid and at least an equivalent amount of a reticulator selected from the class consisting of metal oxides, metal hydroxides, glycols and diamines.

References Cited

UNITED STATES PATENTS

| | | | |
|---|---|---|---:|
| 2,984,655 | 5/1961 | Kirk | 260—41 |
| 2,958,672 | 11/1960 | Goldberg | 260—41 |
| 2,223,171 | 11/1940 | Gaylor | 260—91.15 |
| 2,429,587 | 10/1947 | Schildknecht | 260—91.15 |
| 2,830,032 | 4/1958 | Siebel | 260—0.3 |

MORRIS LIEBMAN, *Primary Examiner.*

D. ARNOLD, *Examiner.*

E. F. McKINNEY, *Assistant Examiner.*